June 3, 1930.  C. L. DEWEY  1,761,331
METHOD OF MAKING BOXES AND COVERS THEREFOR
Filed Dec. 12, 1927   2 Sheets-Sheet 1
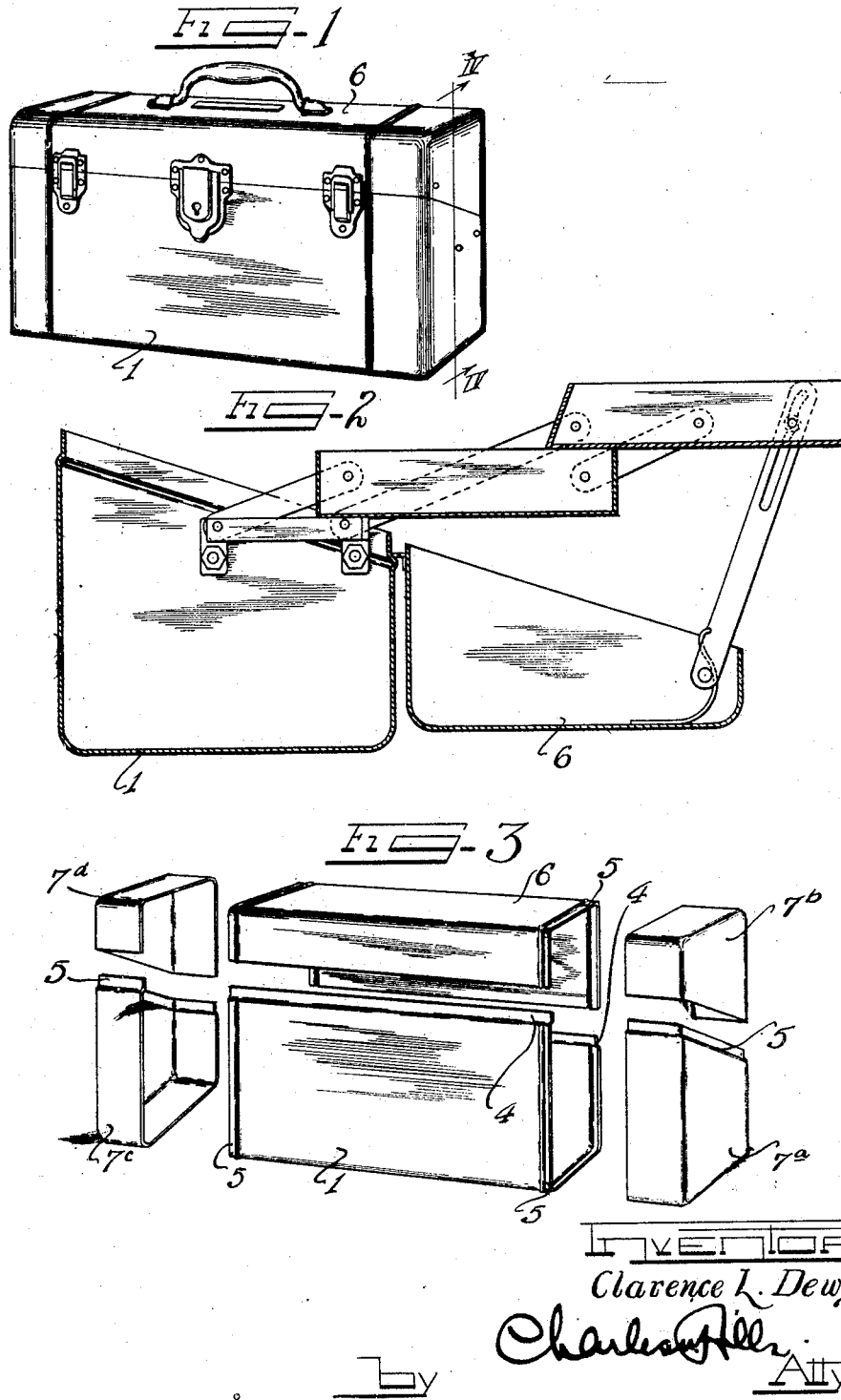
Inventor
Clarence L. Dewey
by Charles ____, Atty June 3, 1930.  C. L. DEWEY  1,761,331
METHOD OF MAKING BOXES AND COVERS THEREFOR
Filed Dec. 12, 1927  2 Sheets-Sheet 2
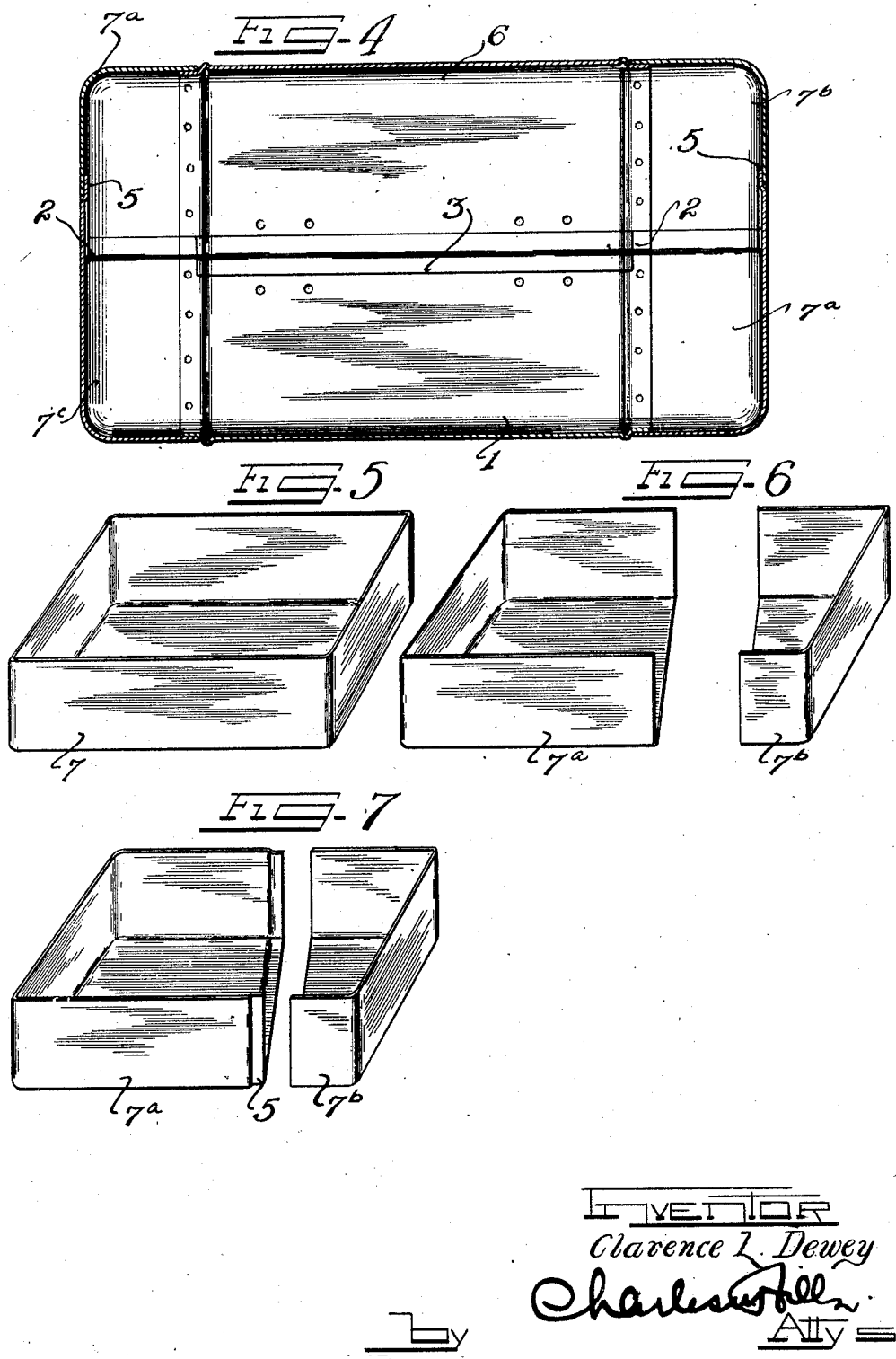

Patented June 3, 1930

1,761,331

UNITED STATES PATENT OFFICE

CLARENCE L. DEWEY, OF ELKHART, INDIANA, ASSIGNOR TO OUTING MANUFACTURING COMPANY, A CORPORATION OF INDIANA

METHOD OF MAKING BOXES AND COVERS THEREFOR

Original application filed June 26, 1926, Serial No 118,616. Divided and this application filed December 12, 1927. Serial No. 239,329.

This invention relates to a method of making a box and cover therefor, and is a division of my pending application, Serial No. 118,616, filed June 26, 1926, which illustrates a tackle box constructed in accordance with the method involving this invention.

It is an object of this invention to provide a simple and economical method of manufacturing a box which reduces the time, labor and costs in the manufacture thereof. The box is illustrated for use as a tackle box, but it should be understood that it may be used for similar and analogous purposes.

The invention comprises the novel method hereinafter described and more particularly pointed out and defined in the appended claims.

In the accompanying drawings, which illustrate a structure made in accordance with the method involving this invention:

Figure 1 is a perspective view of a tackle box constructed according to the method involving this invention.

Figure 2 is a sectional view of the tackle box in open position.

Figure 3 is a perspective view of parts of the tackle box in unassembled relation.

Figure 4 is a sectional view taken upon the line IV—IV of Figure 1.

Figure 5 is a perspective view of a pressed form from which the ends of the box are made.

Figure 6 illustrates the form shown in Figure 5, sheared into two parts.

Figure 7 is a perspective view of the two parts shown in Figure 6 with the margin one part reduced to receive the other part which acts as a cover element.

The method of forming the tackle box consists in stamping a piece of sheet metal into a channel shape 1 with the front side higher than the rear side. The end margins of the rear side are then sheared away as indicated at 2 in Figure 4, leaving a central flap 3 which is folded inwardly and in superposed relation with the rear wall. This strengthens the rear wall where the hinge of the cover is applied. The upper margins of the front and rear walls are then pressed inwardly to provide inwardly offset portions 4 for receiving the margins of the cover. Likewise end margins are offset inwardly as indicated at 5 for receiving the end closures as will later more fully appear.

A second sheet metal plate is then stamped into channel-like formation to provide a cover member 6 which fits over the offset margins of the first member. The end margins of the cover member 6 are also inwardly offset, as indicated at 5, to receive the end closures in telescopic relation for welding purposes.

The above end closures are formed from sheet metal plates which are stamped into the form of rectangular boxes 7 of proper size to correspond to the body portion and cover, as shown in Figure 5. The rectangular boxes are then severed upon oblique lines to provide the two complemental parts or sections 7$^a$ and 7$^b$, as shown in Figure 6. The free end margin of the part 7$^a$ is then inwardly offset as indicated at 5 in Figure 7, to receive the free edge margin of the part 7$^b$ in telescopic relation therewith for covering purposes or the like. The parts shown in Figure 7 are adapted to be welded to the right hand ends of the two afore-described channel members 1 and 6, and they are shown in alinement with such members in Figure 3. Thus, the part or section 7$^a$ fits over the end offset 5 of the part 1 and is adapted to be secured or spot-welded thereon, while the part or section 7$^b$ fits over the end offset of the cover member 6 and is secured or spot welded thereon.

The left hand ends of the channel section 1 and cover member 6 are closed by end sections or closures 7$^c$ and 7$^d$ which are formed in a similar way to the sections 7$^a$ and 7$^b$ except that they are made of opposite hand. They are attached to the body portion 1 and cover member 6 by spot-welding or the like.

It will be appreciated that the method herein described is both simple, novel and economical from a manufacturing standpoint and at the same time it produces a strong and durable article of a fine finished appearance.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. The method of making a box and cover therefor from sheet metal which consists in stamping suitable sheet metal pieces into complemental channel sections, inwardly offsetting the end margins thereof, stamping a third piece of sheet metal into a box-like form, severing said box-like form into two sections, and securing said sections to the ends of said channel sections.

2. The method of making a box and cover therefor which consists in stamping suitable metal pieces into complemental channel-like sections, stamping another piece of metal into the form of a rectangular box of a size corresponding to said channel-like sections, severing said box to provide two complemental parts, fashioning the edge of one part for telescopic relation with the other part, and securing the said parts to the ends of said channel sections.

3. The hereindescribed method of forming a sheet metal box and cover, consisting of stamping a sheet metal strip into channel-like formation, to provide a body portion, folding one margin of the body portion upon itself to provide a reinforced margin, stamping a second sheet of sheet metal into channel-like formation to provide a cover, stamping a third sheet of sheet metal into a rectangular box, severing said box into two complemental sections, and securing one section to the end of the cover and the other section to the end of the body portion and hinging said cover to the reinforced margin.

In testimony whereof I have hereunto subscribed my name.

CLARENCE L. DEWEY.